United States Patent [19]

Harris

[11] 3,798,968

[45] Mar. 26, 1974

[54] TURBINE METER BEARING SUPPORT
[75] Inventor: Lewis K. Harris, Tulsa, Okla.
[73] Assignee: Combustion Engineering, Inc., New York, N.Y.
[22] Filed: June 26, 1972
[21] Appl. No.: 266,011

[52] U.S. Cl. ............................................. 73/231 R
[51] Int. Cl. ......................................... G01f 1/06
[58] Field of Search .................. 73/229, 231; 248/1

[56] References Cited
UNITED STATES PATENTS

| | | | |
|---|---|---|---|
| 3,201,988 | 8/1965 | Liu | 73/231 R |
| 3,433,071 | 3/1969 | Homrig | 73/231 R |
| 3,248,943 | 5/1966 | Francisco | 73/231 R |
| 3,371,531 | 3/1968 | Ezekiel et al. | 73/231 R |

Primary Examiner—Donald O. Woodiel
Assistant Examiner—Arthur E. Korkosz
Attorney, Agent, or Firm—Arthur L. Wade

[57] ABSTRACT

The support and bearing structure for the rotor of a turbine meter is in the form of a spider. Vanes are radiated by inclined surfaces into engagement with the housing bore to fix the bearings for the rotor along the axis of the bore.

4 Claims, 3 Drawing Figures

3,798,968

PATENTED MAR 26 1974

TURBINE METER BEARING SUPPORT

BACKGROUND OF THE INVENTION

1. Field of the Invention

The present invention relates to mounting the rotor of a turbine meter within the bore of the meter body with an expanding spider support for the bearing which engages the rotor. More specifically, the invention relates to a bearing support which utilizes telescoping parts to project vanes as spider structure into rugged, simple, positive engagement with the internal walls of the body bore.

2. Description of the Prior Art

Vibration, pulsating flow, corrosion and erosion will eventually damage the supports of rotor bearings. It is desirable, therefore, to provide for fast and easy replacement of parts.

The prior art discloses many different arrangements with which to support rotor bearings. However, the prior art structures either do not have the simplicity required for an inherently rugged construction or the structures do not lend themselves readily to alignment of the rotor when the support structure is assembled.

SUMMARY OF THE INVENTION

It is an object of the present invention to provide inclined surfaces which can be applied to radiate vane members into engagement with the walls of the bore of a turbine meter body.

It is another object of the invention to radiate and guide vane members with telescoping structures having inclined surfaces.

The present invention contemplates an elongated bolt structure with longitudinal slots formed in the bolt and spaced radially about the axis of the bolt with surfaces at the bottom of the slots which incline relative to the bolt axis. A sleeve is journalled over the bolt and has an opening through the sleeve over each longitudinal slot. A vane of plate form is positioned in each sleeve opening, one end of the vane being engaged by the inclined surface of its bolt slot. Relative longitudinal motion between the sleeve opening along the bolt slot causes the inclined surface to be applied to extending the bane radially from the bolt axis until the outer end of the vane engages the wall of the bore of the meter housing and thereby mounts the bolt within the meter bore. A bearing structure mounted on the end of the bolt then engages the rotor of the meter.

The present invention further contemplates at least three vanes actuated by separate inclined surfaces which are spaced radially about the bolt axis to radiate outward as a form of spider structure to mount the shaft, and its bearing, within the housing bore.

Other objects, advantages and features of this invention will become apparent to one skilled in the art upon consideration of the written specification, appended claims, and attached drawings, wherein;

DESCRIPTION OF THE PREFERRED EMBODIMENT

Figures 1, 2, 3:
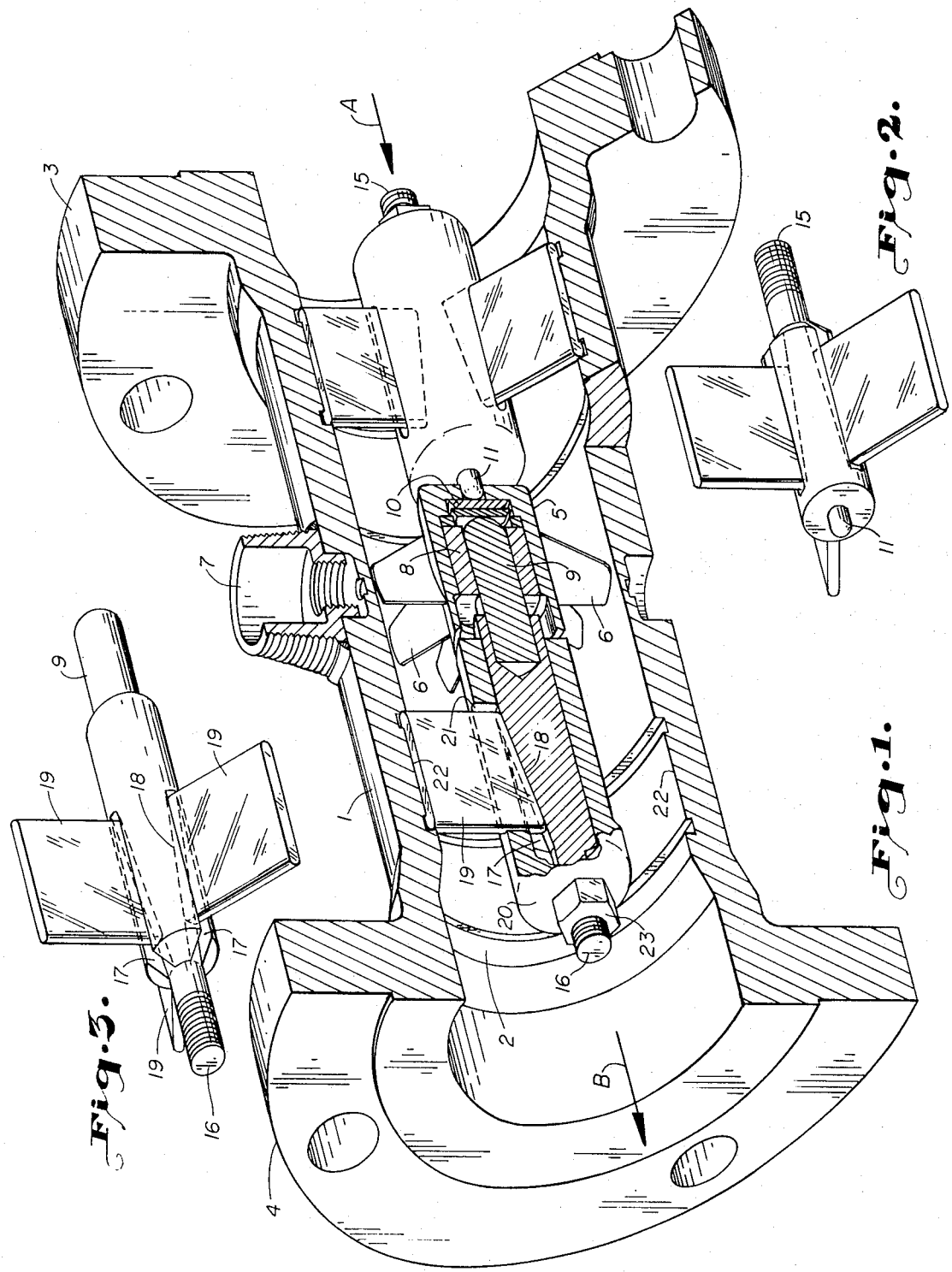
FIG. 1 is a sectioned elevation in perspective of a turbine meter body with supports for the rotor bearing including the present invention.
FIG. 2 is a perspective of the upstream bearing support of FIG. 1 disclosing the vane arrangement in greater detail.
FIG. 3 is a perspective of the downstream bearing support of FIG. 1 disclosing the vane arrangement in greater detail.

Referring to FIG. 1, there is disclosed a flanged body of a turbine meter. Body 1 has a central bore 2 through which fluids to be metered are flowed. Arrow A indicates the direction of fluid flow into the bore 2 and arrow B indicates the flow out of the bore. Flanges 3,4 represent one means with which the body 1 can be included in a conduit and respond to the fluid therethrough.

The primary element of the meter which responds to the fluid flow is rotor 5. It is basically the object of the invention to support rotor 5 on bearings within bore 2 so it will rotate in response to the fluid flow. The vanes 6 each cut magnetic lines of force sustained by a pickup element mounted in nipple 7. The rate at which the lines of force are cut becomes a measure of the fluid flow rate through bore 2.

Rotor 5 is a shell-like housing to which vanes 6 are attached on its external surface. The internal cavity is lined with bearing material 8 and is sized to journal over a bearing shaft 9 mounted at the axis of bore 2. Bearing plate 10 is mounted as a thrust bearing to bear upon bearing shaft 11 which is aligned with shaft 9. Rotor 5 is, thereby, captured by bearing shafts 9 and 11 which are, in turn, mounted in their positions under the teachings of the present invention.

Having cleared the preliminaries and given the proper setting, the present invention can now be hopefully disclosed with simplicity and clarity. Essentially, the structure embodying the invention mounts the shafts 9 and 11 at the axis of body 1, bore 2. The rotor 5 rotates on these shafts, as bearings.

Each shaft is mounted in a structure which will be called a pinion bolt. FIG. 2 discloses pinion bolt 15. FIG. 3 discloses pinion bolt 16. These elongated bolt bodies are each threaded on one end and have one of the bearing shafts mounted on their opposite ends. When these pinion bolts are mounted along the axis of bore 2, their bearing shafts are mounted along the axis of bore 2. The invention to mount these bolts is embodied in both the configuration of the bolts as well as the structure which cooperates with their configuration to generate a form of spider which extends to the walls of bore 2 to coincide the axis of each bolt and the axis of the bore 2 in a mounted relationship.

The pinion bolts each have a number of slots with bottoms having inclined surfaces. Take bolt 16, in FIG. 1, as an example. Each slot is cut down into the bolt 16 to generate an inclined surface. Specifically, slot 17 has its bottom in the form of inclined surface 18. This surface 18 is inclined with respect to the axis of the bolt and is the means applied to the end of a vane to protrude the vane outward, toward the walls of bore 2.

The drawings disclose three slots, and their surfaces, to extend the vanes into engagement with the meter body. It might be possible to use only two slots, but three would be preferable to give minimum stability to the mount. Coordinating the disclosure of all three figures, the configuration of the slots and their inclined surfaces appears simple and understandable.

To actuate the vanes by the inclined surfaces to the vanes, additional structure to guide the vanes is required. Vanes 19 are of plate form. One end is inclined to match the inclined surface of its slot. The other end of the vane is adapted to directly engage the walls of bore 2. To slide this vane structure up the ramp of the inclined surface of its slot, a guide structure is required by the invention.

A guide structure for each pinion bolt is provided in the form of a sleeve, or cage, journalled over the bolt. FIGS. 2 and 3 show the vanes within the slots but without a sleeve in place. In FIG. 1, about pinion bolt 16, sleeve 20 is journalled. Elongated opening 21 is formed through the wall of this sleeve and sized to register with slot 17 and receive the vane as it engages the inclined surface 18.

Bolt 16 telescopes within sleeve 20. As bolt 16 moves toward the position disclosed in FIG. 1, vane 19 is guided along inclined surface 18. Inclined outward, away from the axis of bolt 16, surface 18 and opening 21 of sleeve 20 force vane 19 outward, toward the inner wall of bore 2. A groove 22 is provided in the wall of bore 2 and the outer end of vane 19 enters this groove to positively engage and lock to the bore wall. The other inclined surfaces, spaced radially about the bolt 16, simultaneously actuate their respective vanes. The composite result is the formation of a type of spider structure which bridges between the bolt-sleeve-bearing shaft combination and the position on the bore wall predetermined by groove 22. A nut 23 is threaded on the end of bolt 16. This nut drives bolt 16 toward the disclosed position and locks bolt, sleeve and vanes into their disclosed positions to complete the assembly.

Pinion bolt 15 telescopes within a sleeve exactly as bolt 16 telescopes within sleeve 20. The only structural difference between the two support structures is the form of bearing shaft 9 and bearing shaft 11. Bearing shaft 9 is the longer of the two in order to extend into rotor 5 as the basic, downstream support of rotor 5. Bearing shaft 11 merely gives auxiliary, upstream support to rotor 5 by engaging bearing plate 10. Otherwise, the two supports function in the same way, relative movement between the bolts and their sleeves actuating their respective vanes to form the spider structure locked in their respective grooves of the bore 2.

The disassembly and assembly of this structure is very simple. The bolt and its sleeve are reciprocated to the position which will enable the vanes in their sleeve openings to be inserted within the bore, opposite a groove in the bore wall. The bolt is then pulled into the position disclosed by threading nut 23 onto the bolt to move the inclined surface beneath each vane to push the vanes outward and into their bore groove. Whether the invention is regarded as embodied in the three-part assembly of each spider or in the meter body with the bearing spiders mounted in place, there is provided a structure of obvious simplicity. The simple parts can be made to fine tolerances, yet have inherent ruggedness. Interchangeability of such simple parts is promoted and their assembly and disassembly for repair, service and replacement readily follows.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of this invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. Supports for the rotor of a turbine meter, comprising;
    a pair of assemblies mounted within the body of the meter, each of the assemblies comprising;
    a bolt formed with slots extending longitudinally in the bolt and each slot providing an inclined surface,
    a shaft of bearing material mounted at the end of the bolt and arranged to engage and support the turbine rotor within the body of the meter,
    a sleeve journalled over the bolt and having an opening at one end for the bearing shaft to extend into engagement with the rotor and openings along its length aligned with the slots and their inclined surfaces in the bolt,
    and a vane engaged by each inclined surface of the slots in the bolt, the vanes extending from the inclined surfaes through the aligned sleeve openings toward the inner surface of the meter body,
    whereby the bolt is positioned longitudinally within the sleeve to move the vanes with their inclined surfaces into engagement with the inner surface of the meter body and stabilize the assembly against longitudinal movement within the meter body.

2. The supports of claim 1, wherein;
    means are provided between the ends of each bolt and its sleeve to adjust and fix their relative longitudinal movements to stabilize the assembly against longitudinal movement within the meter body.

3. The supports of claim 1, wherein;
    at least three slots with inclined surfaces are provided for each bolt,
    at least three aligned openings are provided in each sleeve journalled over each bolt,
    and at least three vanes are provided between the inclined surfaces and the meter body.

4. A turbine meter, including;
    a housing body with a bore supported as a part of a conduit in which fluid is conducted for measurement of its flow,
    a rotor positioned within the housing body bore to respond to the flowing fluid by rotating on bearing supports,
    a pair of bearing shafts engaging the rotor to both support the rotor and function as bearings for its rotation,
    a pinion bolt for each bearing shaft mounting the bearing shaft in the end of the bolt and providing a plurality of inclined surfaces within longitudinally extended slots,
    a sleeve journalled over each bolt having an opening over each inclined surface of the bolt,
    and a vane positioned between each inclined surface of the bolt and the wall of the housing body bore, whereby the bolt is positioned longitudinally within the sleeve to move each vane along an inclined bolt surface to bridge between the bolt and the bore wall as a spider support and stabilize the rotor against longitudinal movement within the housing body bore.

* * * * *